T. S. Robinson.
Blacking Brush Handle.
Nº 66,173. Patented Jan. 25, 1867.
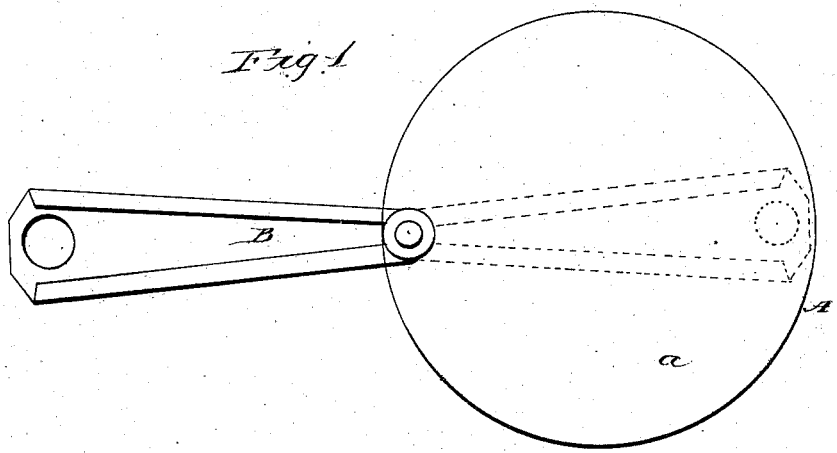
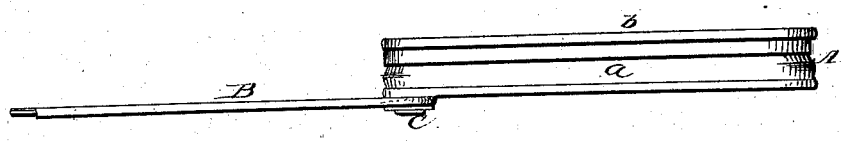

United States Patent Office.

THOMAS S. ROBINSON, OF NEW YORK, N. Y.

*Letters Patent No. 66,173, dated June 25, 1867.*

IMPROVED HANDLE ATTACHMENT FOR BLACKING-BOXES.

*The Schedule referred to in these Letters Patent and making part of the same.*

TO ALL WHOM IT MAY CONCERN:

Be it known that I, THOMAS S. ROBINSON, of the city, county, and State of New York, have invented a new and improved Handle Attachment for Blacking-Boxes; and I do hereby declare that the following is a full, clear, and exact description thereof, which will enable others skilled in the art to make and use the same, reference being had to the accompanying drawings, forming a part of this specification.

This invention is designed to supersede the different holders now manufactured to receive and hold blacking-boxes while the same are being used, the holders serving as a handle for the box and preventing the hand of the operator being soiled by the blacking while charging the brush with the same. The holders are generally constructed of cast iron, and are provided with jaws or fastenings to hold the box. They are not in very general use in consequence of being made separately from the boxes and not sold with them.

My invention consists in attaching a handle of sheet metal or other suitable material to the blacking-box, in such a manner that when the box is not required for use it may be turned or shoved under the box or by the side of the same, so as to be entirely out of the way, and be readily drawn or turned out when it is desired to use the blacking-box. In the accompanying drawings—

Figure 1 is an under view of a blacking-box having my improvement attached to it.

Figure 2, a side view of the same.

Similar letters of reference indicate like parts.

A represents a blacking-box, which may be constructed as usual, composed of two parts, a body or main portion, *a*, and a lid, *b*. To the bottom of the body or main portion *a* of the box, a handle, B, is attached by a rivet, *c*, which passes through the bottom near the edge of the same. This handle may be constructed of sheet metal (scrap-tin) and should not exceed in length the diameter of the box. The handle is allowed to turn on its pivot, and when the box is not in use the handle is turned underneath the bottom, as shown in red in fig. 1, and when the box is required for use the handle is turned outward, as shown in black in both figures. I would remark that the handle B may be riveted to the lid *b* of the box instead of to the bottom, and when the lid is removed from the body or main portion *a*, the latter may be inserted in the former. I would further remark that the handle may be fitted in or between guides so as to slide underneath or out from the box. I prefer, however, the riveting of the handle to the box.

Having thus fully described my invention, what I claim as new, and desire to secure by Letters Patent, is—

The handle B, pivoted at C to the bottom *a* or top *b*, when constructed, arranged, and operating as herein set forth.

THOS. S. ROBINSON.

Witnesses:
   WM. F. McNAMARA,
   ALEX. F. ROBERTS.